United States Patent Office 3,003,944
Patented Oct. 10, 1961

3,003,944
HYDROCARBONS OBTAINED BY DESTRUCTIVE DISTILLATION OF GILSONITE AND PRODUCTS MADE THEREFROM
Nathan W. Davis, 3474 S. 23rd St., Salt Lake City, Utah
No Drawing. Filed Aug. 15, 1956, Ser. No. 604,085
6 Claims. (Cl. 208—22)

This invention relates to hydrocarbons obtained by destructive distillation of Gilsonite and to products made from the distillates.

It is an object of this invention to destructively distill Gilsonite and to obtain therefrom various fractions each of which are separate and distinct insofar as they have different physical and chemical properties.

It is a further object of this invention to use one or more of these fractions to obtain an insecticidal composition.

It is a still further object of this invention to use one or more of these fractions in compounding a paint composition.

A still further object of this invention is to use one of these distilled fractions in producing an elastomeric product.

Gilsonite is a black, brittle, lustrous mineral consisting of hydrocarbons, chiefly found in the southwestern section of the United States, principally in Utah and Colorado.

DESTRUCTIVE DISTILLATION OF GILSONITE

In a steel still directly heated by means of electric resistance units is placed 50 pounds of Gilsonite M.P. 320–350° F. This still is connected to a water cooled condenser and the following fractions obtained at the temperature indicated. For the purpose of further reference in this specification, these fractions have been given the following numbers.

Table of Gilsonite distillates using a 320° F. melt point Gilsonite. The following distillates are obtainable:

| Temperature, F. | No. | Color | Specific Gravity at 70° F. |
|---|---|---|---|
| 326 to 329 | 1 | clear | 0.61 |
| 330 to 334 | 2 | brownish | 0.73 |
| 339 to 341 | 3 | clear slight red | 1.72 |
| 343 to 345 | 4 | clear | 1.71 |
| 345 to 355 | 5 | do | 0.053 |
| 355 to 360 | 6 | brownish black | 1.31 |
| 360 to 366 | 7 | clear | 0.63 |
| 369 to 374 | 8 | do | 0.93 |
| 375 to 380 | 9 | do | 1.12 |
| 380 to 381 | 10 | reddish brown | 1.19 |
| 385 to 397 | 11 | do | 2.11 |
| 390 to 393 | 12 | clear | 0.74 |
| 395 to 400 | 13 | do | 0.87 |
| 410 to 417 | 14 | do | 0.89 |
| 420 to 423 | 15 | slightly brown clear | 0.79 |
| 430 to 438 | 16 | reddish brown | 0.52 |
| 440 to 443 | 17 | brown | 0.90 |
| 445 to 451 | 18 | clear | 0.67 |
| 455 to 456 | 19 | brown | 2.69 |
| 460 to 465 | 20 | clear | 0.054 |
| 465 to 470 | 21 | clear brownish | 0.093 |
| 478 to 483 | 22 | brown | 0.94 |
| 485 to 490 | 23 | clear | 0.0041 |
| 490 to 493 | 24 | clear reddish | 0.005 |
| 495 to 500 | 25 | brownish red | 0.95 |
| 505 to 509 | 26 | clear | 0.17 |
| 510 to 512 | 27 | do | 0.19 |
| 518 to 520 | 28 | brown | 1.03 |
| 525 to 535 | 29 | do | 0.039 |
| 542 to 550 | 30 | brownish clear | 0.73 |
| 570 to 573 | 31 | clear | 0.92 |
| 579 to 582 | 32 | do | 0.53 |
| 583 to 585 | 33 | do | 0.72 |
| 586 to 590 | 34 | brown | 2.007 |
| 595 to 600 | 35 | do | 2.09 |
|  | 36 | gray black dust, when cool, remaining in retort. Weight 120 grams to cu. inch. |  |

More fractions are obtainable but they are not part of this invention.

Example I

A carbon silicate acid is obtained from the 16 fraction by treating as follows:

In a retort that will stand 600 pounds pressure, place—

1 gal. distillate, fraction 16
12 oz. xylene (dimethylbenzene)
2 oz. triethanolamine (trihydroxytriethylamine)
6 oz. silicon mix (finely ground silicon dioxide 100 mesh)

Heat to 250° F. maintaining a pressure of 30 pounds per square inch with continual agitation for one hour.

The retort is then allowed to cool, maintaining the agitation, and when cool, 1 gallon of distilled water is added. This is then distilled and three fractions taken at 230–240° F., 260–270° F. and 310–315° F., using a water cooled condenser. The last fraction, that is, the one boiling at 310–315° F. is a fluid brownish liquid having a specific gravity of .24 at 70° F., and is then diluted with mineral spirits solvent in the ratio of 1 part distillate to 80 parts solvent. The following solvents have also proven satisfactory; Stoddart Solvents manufactured by the Standard Oil Company and turpentine. This material has the following formula $$2H_22CO_2)OH(Si_2O2H_2O$$

This is referred to in this application as Z16. It is a hydrocarbon silicon penetrating oil, a silicon carbonate or carboxy acetic acid.

Similar destructive distillation of coal or crude oil may be run and used in place of the 16th fraction from the destructive distillation of Gilsonite, after the addition of xylene triethanolamine and the silica and distilled, the fraction boiling at 260° F. for crude oil and 310° F. for coal can be used after dilution with mineral spirits.

A product is similarly obtained by treating the #6 fraction as follows:

Mix in a heated retort with agitation—

1 gal. of #6 fraction (an oily brown, black material having a specific gravity of 1.31 at 70° F.)
7 oz. triethanolamine (trihydroxytriethylamine)
1 lb. silicon mix (finely ground silicon dioxide 100 mesh)
20 oz. xylene (dimethylbenzene)

Mix and heat under pressure to 300° F. maintaining a pressure of 20 lbs. per square inch with continual agitation for one hour. Cool and add 1 gal. of distilled water and 1 pt. turpentine. Heat with agitation to 256° F. and distill. An oily distillate having a specific gravity of .63 at 70° F. is obtained. This is a very toxic material and is used in the preparation of insecticides referred to below. This is heretofore referred to as the Z6 material. This material has the following formula:

$$4H_24CO_2)OH(2Si_2O2H_2O$$

Example II.—Paint

A black colloidal non-toxic paint for waterproofing and rust-proofing metal, wood, concrete, etc., which is resistant to heat, acid and alkali and moisture can be applied by brushing, spraying or dipping is prepared as follows:

Mix and heat in an open vessel—

20 gal. petroleum solvent, such as mineral spirits or xylene
10 gal. boiled linseed oil
10 gal. turpentine, wood distilled or gum spirits of turpentine.

After heating to 100° F. slowly add 125 lbs. pulverized 150–200 mesh Gilsonite, a pigment melting at 320–350° F. This mixture is then heated to 150° F., then slowly add 4 gals. of varnish (PT 358 National Lead Company), 1 gal. "Petronate" 8 or 9, Sonneborn Sons Inc., New York, wetting agent.

2 qts. of a mixture of 1 part lead, 1 part cobalt and 2 parts manganese drier
1 pt. of the penetrating oil not diluted, obtained as outlined above (Z16).

This mixture is heated until the mixture reaches 200° F., continuously mixing for 15 minutes and then allowed to cool. It is drawn off and sealed in containers. This produces approximately 55 gals. of paint.

*Example III.—Aluminum paint*

An aluminum paint, slightly toxic, which is resistant to heat, acid and alkali, as well as moisture, can be applied by spraying, brushing or dipping, is prepared as follows:
Mix in an open agitator—

12 gal. boiled linseed oil
10 gal. petroleum solvent, such as mineral spirits or xylene
6 gal. paint prepared as in Example II
10 gal. 50–50 coal resin and petroleum solvent, 50% ordinary coal resin, 50% mineral spirits
3 gal. #30 aluminum pigment ground in oil
2 qts. Petronate 8 or 9 (wetting agent) (manufactured by Sonneborn Sons Inc. of New York)
2 qts. mixed drier (1 part lead, 1 part cobalt, 2 parts manganese)
1 pt. carbon silicate acid prepared as set forth above in Example I (Z16).

Mix thoroughly until all of the aluminum pigment is suspended, then draw off and seal in containers.

*Example IV.—Insecticides*

The following composition is prepared by mixing in an ordinary agitator:

10 lbs. wheat bran (vehicle)
1 pt. corn syrup (bait)
2 lbs. Gilsonite Z6 (poison)
2 oz. arsenic trioxide (optional), (poison)
2 oz. benzaldehyde (attractant).

This insecticide is especially effective on earwigs, cockroaches and silver fish.

*Example V.—Insecticides*

The following composition is prepared by mixing in an ordinary agitator.
Mix together with continuous agitation—

3 gal. kerosene (solvents)
2 gal. turpentine (solvents)
2 oz. oil of Pennyroyal (an essential oil), (attractant)
4 oz. creosol dip (poison)
6 oz. carbon-silicate acid Z6 prepared according to Example I given above before dilution with mineral spirits (poison)
1¼ oz. chlordane (octa-chlor-hexahydro-methanoindene), (poison)
3 oz. odormask M, D, or H, Polok and Schwars Inc. of New York.

This is particularly effective for termites, ants, spiders, and related insects.

*Example VI.—Elastomer*

This process is adapted to the use of any paraffinic hydrocarbon, such as Gilsonite, elaterite (commonly known as Wurtzalite), Sunnyside hydrocarbons, Rozel asphalt, and also bituminous coal. If bituminous coal is used as the basic material, the first step is slightly varied from the first step applicable when another hydrocarbon is used as the basic material.

STEPS IN THE PROCESS

STEP NO. 1

(A) *For hydrocarbons other than bituminous coal.*—If a solid hydrocarbon other than coal is used as the base material, the hydrocarbon should be powdered. The first mass consists of 27 pounds or any multiple thereof, and based upon a 27 pound quantity, the materials are used in the following ratios:

20 pounds of any paraffinic hydrocarbon other than coal, such as powdered Gilsonite, elaterite (Wurtzalite), Sunnyside hydrocarbons, etc. or Rozel asphalt or other semi-liquid hydrocarbon.
7 pounds of raw linseed oil, or hydrogenated cottonseed oil or any other acid base vegetable oil.
—
27 pounds This mass as combined is mixed thoroughly until smooth, at normal room temperature.

(B) If bituminous coal is used as the base material, the first step is as follows, using a mass of 27 pounds or any multiple thereof:

18  pounds of powdered bituminous coal
1.5 pounds of Z16 oil product from Gilsonite as described above in Example I
.5  pound of an oil produced from a solid or semi-solid hydrocarbon at a temperature of 490° F.[1]
    This is the 24 fraction shown previously
7   pounds of raw linseed oil, or any substitute having same reaction and same chemical properties
—
27  pounds

[1] These oils are processed by distillation by heating solids or semi-solid hydrocarbons to the temperatures F. as indicated.

This mass as combined is mixed thoroughly until smooth, at normal room temperature.

STEP NO. 2

Add to the foregoing base mass as compounded in Step No. 1, one pound of an oily wax, preferably a substance known as Altawax (or any other oily wax having the same chemical properties and reactions). A description of the process for making Altawax is indicated hereinafter. This wax should be added by mixing it with the base material described in Step No. 1.

STEP NO. 3

Add 1½ pounds of a sulfonated product obtained by treating cut No. 2 from the distillation of Gilsonite as described above, which boils within the range of 330–334° F. with sulfuric acid and then add 10% furfural and 5% oleic acid to 85% of the sulfonated product. This is then distilled and a cut distilling at 340° F. to 590° F. The residue is the Altawax referred to above.

STEP NO. 4

Add one-half pound of furfural which will aid polymerization and also one pound of zinc sulphate which will act as an accelerator of polymerization.

In lieu of zinc sulphate, at least one, of any number of other accelerators may be used to produce the same result, some of which are produced commercially under specified trade-names, such as: Santocure, Resinex, Silicon, Lumanall, Sulfurdioxide, Ethyleneglycol, Diethyleneglycol, Cresylic Acid, Naphthenic Acid, Sodium sulfonate, Santicizer 141, Peracetic Acid, Elastex 50 B, Carbonex, Bordol, Glycerine, or Oxalic Acid. Various other chemicals or commercial substances may be used which produce the same results.

STEP NO. 5

When all of the substances indicated in Steps No. 1, 2, 3 and 4 have been combined, regardless of which substance is first added to the mixed mass of Step No. 1, whether material described in Steps No. 2, 3 or 4, the aggregate of all of these substances should be mixed thoroughly for approximately one hour at ordinary room temperature, not less than 40° F. nor in excess of 120° F.

STEP NO. 6

The aggregate so compounded and mixed is then subjected to slow heat. The temperature should be stepped up gradually until it reaches 200° F. within a period of two and one-half hours, during which time the compounded substances should be mixed at a moderate speed. The compounded substances should continue to be mixed at such speed for approximately 6 hours at 200° F. from the time when such temperature is first reached.

STEP NO. 7

The temperature is then gradually increased to 350° F. with an increase of pressure to 50 pounds, the mixing continuing during this increase in temperature. This mixing process at 50 pounds pressure and at 350° F. temperature continues for about 64 hours, unless the time is reduced by additional catalyst or booster in Step No. 4, as herein indicated.

To accelerate Step No. 7 and to reduce the time from 64 hours normally required in Step No. 7, any one or more of the catalysts or accelerators indicated in Step No. 4 may be added to the zinc sulphate in such quantity as the type of final product may be desired. The extent of reduction in time depends upon the combination and quantity of the accelerators used, however at a slight sacrifice of quality.

STEP NO. 8

The temperature is then slowly decreased to 250° F. over a period of about 3 hours, during which time the mixing process continues.

STEP NO. 9

Two pounds of water and one pound of potassium sulfate for a plasticizer, are then added to the mass while the mixing process continues.

STEP NO. 10

The temperature remains at 250° F. while the pressure is increased to 60 pounds by the addition of the water as indicated in Step No. 9. This pressure and this temperature are maintained for about 3 hours while the mixing continues.

STEP NO. 11

The pressure and temperature are then reduced slowly until pressure is entirely released and reduced to zero, and the temperature is reduced to 100° F., while mixing continues.

STEP NO. 12

At this stage 2 pounds of sulphur (which should be at least 90% pure, if possible) should be added to the mass, unless the base material is Rozel asphalt in which event sulphur is not added. There should also be added at this stage of the processing 5 pounds of calcium oxide. These ingredients should be mixed into the mass for about 8 hours at a temperature of about 100° F., in an open container under sunlight or ultra-violet rays or other light which produces the same general reaction as sunlight.

STEP NO. 13

The mixing process is then retarded until the mass becomes rubbery and appears somewhat dry. This period should normally occupy about 4 hours.

STEP NO. 14

The processed mass is then removed from the autoclave or other suitable mixing machine which has pressure and heating facilities, and then cured by sunlight or artificial light having similar reaction power. The length of this phase of the process depends upon intensity of light and humidity. Sufficient moisture must be in the atmosphere to facilitate the curing process.

STEP NO. 15

The cured mass is then ready for use. The material is also in condition for introduction of any rubber extenders or fillers, if desired, to give the elastomer a different degree of resiliency, or in order to reduce elasticity.

Example VII.—Ore reduction process

This process is adapted to a separation of complex mineral ores after the raw ore has been crushed and ground to the customary mesh common in conventional means of ore separation. The process is adaptable to all types of complex minerals including radioactive material, ferrous and nonferrous minerals.

STEPS IN THE PROCESS

STEP NO. 1

The complex ore as it comes from the ball mill or other grinding device at the required mesh is placed into an agitated heated tank for conditioning where the ore material is mixed with warm water to a specific gravity of 60. Sulfuric acid is then mixed with the material in an amount equal to 1% of the lime content of the ore material while in the process of raising the temperature of the slurry to 200° F. Said temperature should not be obtained however until after completion of the second step.

STEP NO. 2

During the process described above in Step No. 1, when the lime has quit foaming introduce into the slurry the material previously described in this invention as Z16, in the amount equivalent to ¼ of 1% of the sulfuric acid previously used. Then continue to mix or agitate the slurry for twenty minutes or until the temperature of the slurry obtains 150° F. whichever event occurs first.

STEP NO. 3

Now add hydrochloric acid in an amount equal to ¼ of the sulfuric acid previously added. Continue to mix or agitate for thirty minutes or until the slurry reaches the temperature of 200° F., whichever occurs first.

STEP NO. 4

Now introduce sodium bicarbonate into tank No. 2 in an amount by weight equivalent to twice the number of pounds of sulfuric acid by weight which has been previously added, then empty tank No. 1 into tank No. 2 and slowly agitate.

STEP NO. 5

Then add potassium iodine in an amount equivalent of 2% of the sodium previously added.

STEP NO. 6

Then add and mix into the slurry aluminum nitrate in an amount equivalent of 1% of the potassium iodine previously used. The agitation is now discontinued and the material allowed to settle. A scum forms on the top which is skimmed off and introduced into a separate tank No. 3 containing the same amount of sodium sulfate as there was potassium iodine used previously. Here the scum or material skimmed off settles and the precipitant is drawn off into evaporating tanks. This is the radioactive material.

STEP NO. 7

If the ore headings contain carbon, use nitric acid in place of sulfuric acid in the preceding steps.

STEP NO. 8

The aforesaid steps permit the separation of various ores in the precipitant material contained in tank No. 2 or the soda tank as described in Step No. 4. The various ore particles are free and independent of each other and can be concentrated by conventional methods such as tabling or flotation.

Many minor changes could be made in the above process as described in this application. All such changes come within the scope of this invention. The important feature is the introduction of the Z16 material and its faculty to penetrate through and cause separation at the microscopic seams or contact points between the various

What is claimed is:

1. A method of preparing a brownish black oil having a specific gravity of 1.3 at 70° F., which comprises introducing into a still powdered Gilsonite having a melting point of 320 to 350° F. and fractionally distilling the same and separating that fraction which distills between 355 and 360° F.

2. A method of preparing a reddish brown liquid having a specific gravity of 0.52 at 70° F., which comprises, introducing into a still, powdered Gilsonite having a melting point of 320 to 350° F. and fractionally distilling the same and separating that fraction which distills between 430 and 438° F.

3. A product obtained by adding to 1 gallon of the distillate boiling between 430 and 438° F., obtained by the destructive distillation of Gilsonite, 12 ounces of xylene, 2 ounces triethylolamine and 6 ounces of silicon dioxide, heating under pressure and cooling, adding distilled water and then fractionally distilling the same, and removing that fraction boiling between 310 and 315° F.

4. A product obtained by adding to 1 gallon of the distillate boiling between 355 and 360° F., obtained by the destructive distillation of Gilsonite, 20 ounces of xylene, 7 ounces triethylolamine and 1 pound of silicon dioxide, heating under pressure to 300° F. and cooling, adding 1 gallon of distilled water and 1 pint of turpentine and then distilling the same, and removing that fraction boiling above 256° F.

5. A brownish black liquid having a specific gravity of 0.52 at 70° F., which is recovered from the destructive distillation of Gilsonite, having a melting point range of 320° F. to 350° F., said fraction being separated at 430° F. to 438° F.

6. A brownish black liquid having a specific gravity of 1.31 at 70° F. which is recovered as a fraction from the destructive distillation of Gilsonite having a melting point within the range of 320° F. to 350° F., said fraction being separated at 355° F. to 360° F.

References Cited in the file of this patent

UNITED STATES PATENTS

| | | |
|---|---|---|
| 1,105,102 | Robinson | July 28, 1914 |
| 1,573,764 | Forrest | Feb. 16, 1926 |
| 1,573,765 | Forrest | Feb. 16, 1926 |
| 1,612,672 | Vivas | Dec. 28, 1926 |
| 1,813,575 | Janecke | July 7, 1931 |
| 1,940,725 | Morrell | Dec. 26, 1933 |
| 1,954,866 | Egloff | Apr. 17, 1934 |
| 1,972,944 | Morrell | Sept. 11, 1934 |
| 2,285,646 | Clocker | June 9, 1942 |
| 2,344,189 | Waldie | Mar. 14, 1944 |
| 2,574,971 | Heltzer | Nov. 13, 1951 |
| 2,580,048 | Shmidl | Dec. 25, 1951 |
| 2,619,446 | Andersen | Nov. 25, 1952 |
| 2,635,978 | Massengale | Apr. 21, 1953 |
| 2,661,331 | Howard | Dec. 1, 1953 |
| 2,719,116 | Brown | Sept. 27, 1955 |
| 2,722,512 | Crandall | Nov. 1, 1955 |
| 2,727,054 | Wright | Dec. 13, 1955 |
| 2,742,372 | Colvin | Apr. 17, 1956 |
| 2,752,381 | Peppel | June 26, 1956 |
| 2,758,126 | Goldschmidt | Aug. 7, 1956 |
| 2,846,361 | Mekler | Aug. 5, 1958 |

OTHER REFERENCES

Abraham: "Asphalts and Allied Substances," 5th ed., vol. 1, 1945, page 253, D. Van Nostrand Co., Inc., New York.

Chem. and Eng. News, vol. 34, July 23, 1956, page 3546.